United States Patent [19]

Lermann et al.

[11] 4,096,500
[45] Jun. 20, 1978

[54] STILL- OR MOTION-PICTURE CAMERA OR REPRODUCING APPARATUS

[75] Inventors: Peter Lermann, Narring; Eduard Wagensonner, Aschheim, both of Germany

[73] Assignee: AGFA-Gevaert AG, Leverkusen, Germany

[21] Appl. No.: 799,325

[22] Filed: May 23, 1977

[30] Foreign Application Priority Data

May 26, 1976 Germany .............................. 2623690

[51] Int. Cl.² ......................... G03B 1/18; G03B 19/18; G03B 21/32
[52] U.S. Cl. ....................... 354/173; 352/137;166;169
[58] Field of Search ............. 354/173; 352/3, 5, 91 R, 352/121, 137, 141, 166, 169, 174, 175; 355/53, 54, 40

[56] References Cited

U.S. PATENT DOCUMENTS 3,888,780   6/1975   Tucker ............................. 352/166 X
4,009,959   3/1977   Watson et al. ................. 352/91 R X Primary Examiner—L. T. Hix
Assistant Examiner—M. L. Gellner
Attorney, Agent, or Firm—Michael J. Striker

[57] ABSTRACT

A scene-pause counter, a scene-production counter, and a repetition counter are connected in a series. Each counter furnishes its count to an associated comparator which also receives a signal from an addressable read-only memory. Pulse trains are applied to the counters. When a comparator in the series detects coincidence, it initiates counting by the next counter. When the last comparator in the series detects coincidence it can restart the first counter. A program-selector switch causes different address signals to be applied to the memory, resulting in different operations of different durations, in different combinations and sequences. This makes possible projection or exposure of single frames or series of frames with intermediate pauses between the projection or exposure of successive frames or series of frames, as well as repetitions of such combinations of operations.

8 Claims, 3 Drawing Figures

| PRO-GRAM | | | ADRESS | | |
|---|---|---|---|---|---|
| | | | A | B | C |
| 1 | SINGLE FRAME | PAUSE 100 ms | 1 | 0 | 0 |
| 2 | TITLE | REPETITIONS 8 | 0 | 1 | 0 |
| 3 | SCENE | SCENE 5,08 s | 1 | 1 | 0 |
| 4 | AUTOMATIC SINGLE FRAME | PAUSE 100 ms | 0 | 0 | 1 |
| 5 | AUTOMATIC SINGLE FRAME | PAUSE 500 ms | 1 | 0 | 1 |
| 6 | AUTOMATIC SINGLE FRAME | PAUSE 1 s | 0 | 1 | 1 |
| 7 | AUTOMATIC SINGLE FRAME | PAUSE 2 s | 1 | 1 | 1 |
| 8 | AUTOMATIC SINGLE FRAME | PAUSE 6,3 s | 0 | 0 | 0 |

*Fig. 2*

| PRO-GRAM | PAUSE | | | | | | | SCENE | | | | | | | REPETITION | | | END-LESS |
|---|---|---|---|---|---|---|---|---|---|---|---|---|---|---|---|---|---|---|
| | Q1 | Q2 | Q3 | Q4 | Q5 | Q6 | Q7 | Q8 | Q9 | Q10 | Q11 | Q12 | Q13 | Q14 | Q15 | Q16 | Q17 | Q18 |
| 1 | 1 | 0 | 0 | 0 | 0 | 0 | 1 | 0 | 0 | 0 | 0 | 0 | 0 | 0 | 0 | 0 | 0 | 0 |
| 2 | 1 | 1 | 0 | 0 | 0 | 0 | 1 | 0 | 0 | 0 | 0 | 0 | 0 | 0 | 0 | 0 | 1 | 0 |
| 3 | 0 | 0 | 0 | 0 | 0 | 0 | 1 | 1 | 1 | 1 | 1 | 1 | 1 | 0 | 0 | 0 | 0 | 0 |
| 4 | 1 | 0 | 0 | 0 | 0 | 0 | 0 | 0 | 0 | 0 | 0 | 0 | 0 | 0 | 0 | 0 | 0 | 1 |
| 5 | 1 | 0 | 1 | 0 | 0 | 0 | 1 | 0 | 0 | 0 | 0 | 0 | 0 | 0 | 0 | 0 | 0 | 1 |
| 6 | 0 | 1 | 0 | 1 | 1 | 0 | 1 | 0 | 0 | 0 | 0 | 0 | 0 | 0 | 0 | 0 | 0 | 1 |
| 7 | 0 | 0 | 1 | 0 | 0 | 0 | 1 | 0 | 0 | 0 | 0 | 0 | 0 | 0 | 0 | 0 | 0 | 1 |
| 8 | 1 | 1 | 1 | 1 | 1 | 1 | 1 | 0 | 0 | 0 | 0 | 0 | 0 | 0 | 0 | 0 | 0 | 1 |

Fig. 3

STILL- OR MOTION-PICTURE CAMERA OR REPRODUCING APPARATUS

BACKGROUND OF THE INVENTION

The invention relates to still-picture and motion-picture cameras and projectors, and more particularly to the control of the number of times, the durations, and the sequences in which scene exposure or projection operations, pauses intermediate the exposure or projection of single frames or series of frames, and the repetitions of combinations of such operations occur.

SUMMARY OF THE INVENTION

It is a general object of the invention to provide a control system of relatively simple design capable of controlling any and all of the above.

It is another object to provide a control system of universal character, i.e., which can be used to control numbers, durations, sequences and repetitions of operations in any one of a still-picture camera, a motion-picture camera, a slide or film-strip projector or a motion-picture projector.

It is also an object to provide a control system of such design as to be appropriately realizable in integrated-circuit form.

According to one concept of the invention, this can be achieved as follows. A pulse generator supplies pulses to frequency dividers, which generate frequency-divided pulse trains whose pulse-repetition frequencies and periods determine the shortest selectable duration for each of the different operations to be controlled. Associated with each different operation is a respective digital counter. Each counter supplies a count signal to an associated comparator, which latter also receives an input signal from an addressable read-only memory. The signals furnished by the memory to the comparators are determined by a program selector switch which furnishes address signals to the memory. When one of the comparators detects coincidence between its two sets of input signals, it stops and resets its associated counter to terminate the operation controlled by the counter and then also causes the next counter in the counter series to start counting. A logic feedback circuit connects the output of the last comparator in the series to the start input of the first counter in the series. The output of at least one of the comparators is connected, via a start-and-stop line, to a logical switching stage which controls the operation of an electromagnetic activator and/or electric motor. Advantageously, a single pulse generator together with the frequency-divider(s) establishes the shortest selectable times for the respective operations and combinations of operations.

A particular advantage of the inventive control system is that a very considerable number and variety of operations are broken down into a minimum number of modular or constituent operations, and it is these modular or constituent operations which are being directly controlled, their combinations then constituting the more complicated and various operations which are of actual practical interest. For example, the complex operations are each composed of a time-delay operation, a subsequent scening or signalling operation, plus a repeat operation in which the time-delay operation and/or the scening or signalling operation are repeated.

The program selector switch selects the program to be used by furnishing corresponding address signals to the read-only memory. For example, three address lines create the possibility of eight selectable operating programs, which will usually be more than enough for any one of the four types of apparatus in question.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a tabulation of eight exemplary selectable programs for a motion-picture camera, and of the address signals associated therewith; and FIG. 3 is a truth table corresponding to the eight programs tabulated in FIG. 2.

DESCRIPTION OF THE PREFERRED EMBODIMENT

Figure 1:
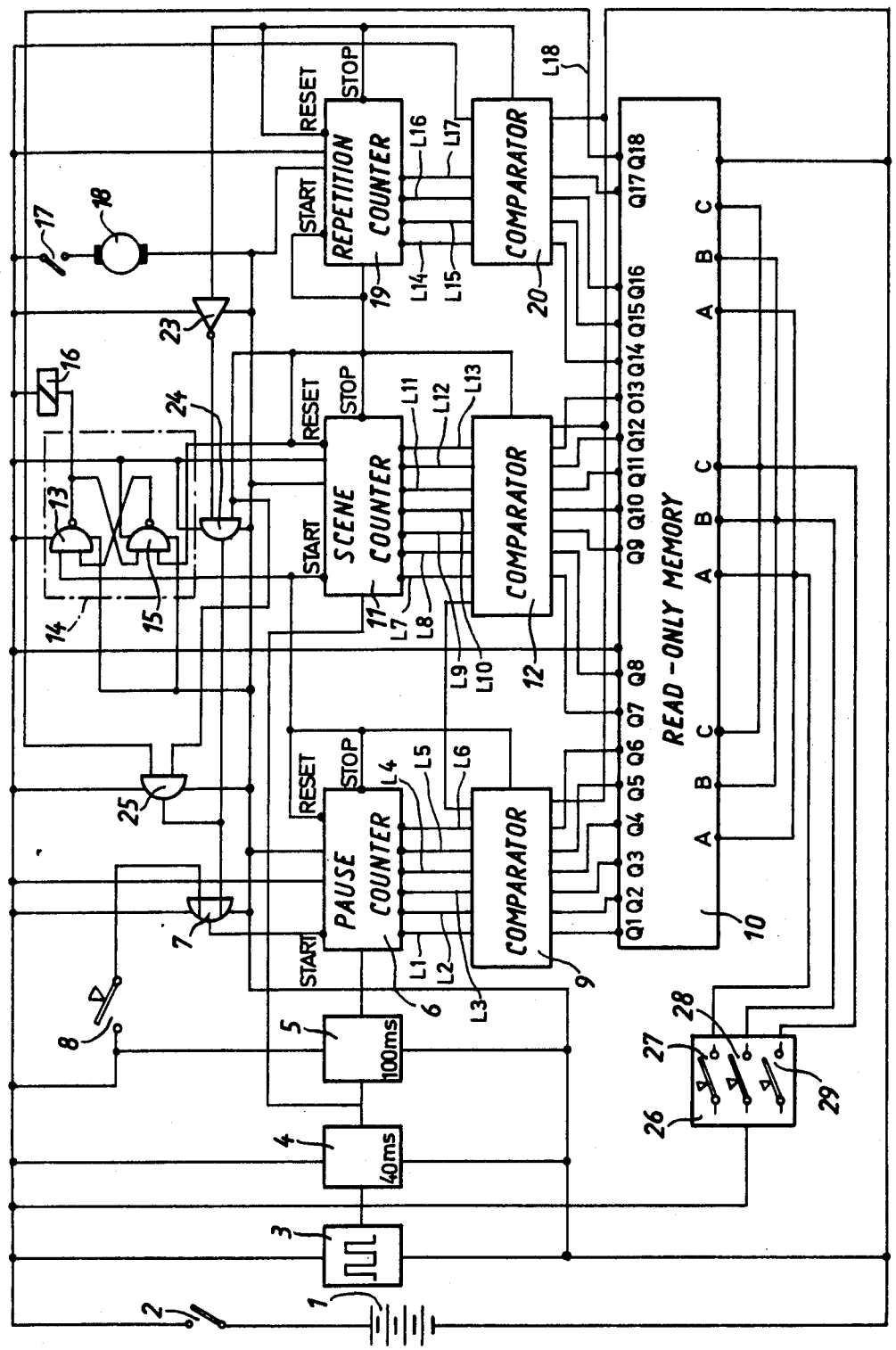
FIG. 1 depicts an exemplary embodiment of a circuit which can be used to implement the inventive concepts.

In FIG. 1, numeral 1 denotes a battery which is connectable by a power switch 2 to the remainder of the illustrated circuitry. A pulse generator 3 (e.g., an astable multivibrator) is connected at its output to the input of a first frequency divider 4. The output of frequency divider 4 is connected to the input of a second frequency divider 5. The pulse-repetition period of the pulse train at the output of frequency divider 4 is, for example, 40 milliseconds and corresponds, in the case of a motion-picture apparatus, to the exposure-duration for a single frame. The pulse-repetition period of the pulse train at the output of frequency divider 4 is, for example, 100 milliseconds and corresponds, in the case of a motion-picture apparatus, to the shortest selectable pause duration between successive frame exposures.

The output of frequency divider 5 is connected to the trigger input of a pause counter 6, whose internal circuitry is comprised of (non-illustrated) clocked JK flip-flops. To avoid overcrowding in FIG. 1, the clocking inputs of clocked elements have been omitted. Pause counter 6 has a start input which is connected to the output of an OR-gate 7. One input of OR-gate 7 is connectable via a release switch 8 to the positive terminal of battery 1. The pause counter 6 is additionally provided with a stop input as well as a reset input. Pause counter 6 has six output lines, denoted by L1 to L6. These lines L1 to L6 are connected to respective ones of the six actual-value inputs of a comparator 9. Comparator 9 also has six desired-value inputs, connected to respective ones of six outputs Q1 to Q6 of a read-only memory (ROM) 10.

Read-only memory (ROM) 10 is a conventional information-processing component. Typically, read-only memories are preprogrammable electronic storage devices which, at the time of their manufacture, have write signals applied to them, resulting in the indefinite (i.e., permanent) storage of corresponding information. Then, during use of the ROM, the stored information can be read-out as many times as desired, without any possibility of destruction or alteration of the stored information. Typically, such read-only memories are comprised of two parts, a decoder operative for converting input information (e.g., address signals) into a 1-out-of-n code, plus the binary storage units (e.g., internal flip-flops) themselves. Usually, each binary storage unit is connected to one input of a respective AND-gate, the other input of which receives address information, for preventing or permitting the information stored in the storage unit to pass out to one of the outputs of the ROM. The outputs of these AND-gates are connected to the outputs of the ROM by OR-gates, in combinations corresponding to the pre-established addressing scheme. All this is conventional, and is mentioned for the sake of brief review, only.

The output (right terminal) of comparator 9 is connected to the stop-and-reset input of the pause counter 6. Also, the output of comparator 9 is connected to the start input of a scene counter 11, whose trigger input is connected to the output of frequency divider 4.

Scene counter 11 has seven output lines L7 to L13 which are connected to seven actual-value inputs of a comparator 12, whose seven desired-value inputs are connected to seven outputs Q7 to Q13 of the ROM 10. The output (right terminal) of comparator 11 is connected to the stop-and-reset input of scene counter 11.

The start input of scene counter 11 is also connected to one input of a NAND-gate 13, which latter forms part of a flip-flop 14. The reset input of scene counter 11 is connected to one input of another NAND-gate 15 within flip-flop 14. The other input of NAND-gate 13 is connected to the output of NAND-gate 15, whereas the other input of NAND-gate 15 is connected to the output of NAND-gate 13. Connected in the output circuit of NAND-gate 13 is an electromagnet 16 which controls a contact 17 connected in the current path of the motor 18 for a rotary shutter mechanism.

The output of comparator 12 is additionally connected to the trigger input of a repetition counter 19, and furthermore to the start input of counter 19. The four output lines L14 to L17 of repetition counter 19 are connected to the four actual-value inputs of a comparator 20, whose four corresponding desired-value inputs are connected to four outputs Q14 to Q17 of the ROM 10. The output (right terminal) of comparator 20 is connected to the stop-and-reset input of repetition counter 19. The output of comparator 20 is also connected to the input of an inverter 23, whose output is connected to one input of an AND-gate 24. The other input of AND-gate 24 is connected with the output of the comparator 12 associated with scene counter 11. The output of AND-gate 24 is connected with the other input of the OR-gate 7.

The last output Q18 of ROM 10 is connected via a line L18 to one input of an AND-gate 26, whose other input is connected to the comparator 12 associated with scene counter 11. The output of AND-gate 25 is connected to the same input of OR-gate 7 as is the output of AND-gate 24.

The address inputs of ROM 10 are denoted by A, B and C. These inputs A, B, C are connected with an address-selecting arrangement 26, here shown as comprised of three selector switches 27, 28, 29.

FIG. 2 tabulates the selectable eight programs 1-8 of the exemplary embodiment and the coding of the associated address words. FIG. 3 is a set of truth tables for the ROM 10.

The operation of the exemplary embodiment is as follows:

To select Program 1 (single-frame exposure), switch 27 of program selector 26 is closed, whereas switches 28 and 29 are left open. Consequently, as tabulated in FIG. 2, "1" signals are applied to the address inputs A of ROM 10, whereas "0" signals are applied to the address inputs B and C. In response to this address word for Program 1, the signals appearing at the eighteen outputs Q1 to Q18 of ROM 10 are the ones tabulated in FIG. 3, for Program 1. Specifically, a "1" signal appears only at ROM outputs Q1 and Q7.

Power-connect switch 2 is now closed, and accordingly operating voltage is applied to the illustrated circuitry. Pulse generator 3 oscillates with a frequency such that the pulse-repetition period between its successive output pulses is small compared to the exposure duration of 40 milliseconds (the pulse-repeition period of the output pulses of frequency divider 4). The 40-millisecond pulses from divider 4 are applied to the trigger input of scene counter 11, but have no effect thereon, because a start pulse has not yet been applied to counter 11. The same holds true for pause counter 6, to whose trigger input the 100-millisecond pulses from frequency divider 5 are being applied.

When release switch 8 is then closed, a "1" signal is applied to OR-gate 7; as a result, a "1" signal is applied to the start input of pause counter 6. This permits pause counter 6 to start counting. After receipt by counter 6 of the first 100-millisecond pulse, the signal distribution on the output lines L1 to L6 of counter 6 corresponds to line 1 of the FIG. 3 truth table. Since the actual-value signals (on lines L1 to L6) now already equal the desired-value signals (from ROM outputs Q1 to Q6), the comparator 9 furnishes at its output a "1" signal to the stop-and-reset input of pause counter 6, causing the latter to immediately stop counting, and also to become reset.

Simultaneously, the output "1" signal from comparator 9 is applied to the start input of scene counter 11, which is accordingly permitted to start counting. Simultaneously, the output "1" signal from comparator 9 is also applied to the upper input of flip-flop 14, causing electromagnet 16 to become energized, and thereby closing the current path of motor 18. After scene counter 11 has counted the first 40-millisecond pulse from frequency divider 4, output line L7 carries a "1" signal, whereas output lines L8 to L13 carry "1" signals. Accordingly, after 40 milliseconds (here assumed to correspond to the exposure duration for a single frame), the actual-value signal distribution for comparator 12 corresponds to the desired-value signal distribution tabulated in line 1 of FIG. 3 for the ROM 10. Therefore, comparator 12 furnishes at its output a "1" signal to the stop-and-reset input of scene counter 11, causing the latter to stop counting and become reset. Simultaneously, the output "1" signal from comparator 12 is applied to the lower input of flip-flop 14, causing the electromagnet 16 to become deenergized, thereby interrupting the current path for drive motor 18.

Simultaneously, the output "1" signal from comparator 12 is also applied to both the trigger input (left input) and start input of repetition counter 19. However, for Program 1, this does not result in the repetition counter 19 beginning to count; for Program 1, the desired-value signals on lines Q14 to Q18 are all "0" (as shown in FIG. 3), so that comparator coincidence is in existence before counter 19 counts the first pulse applied thereto. Thus, simultaneous with the application of a start pulse to repetition counter 19, the comparator 20 furnishes at its output a "1" signal to the input of inverter 23, which in turn at its output furnishes a "0" signal to the associated input of AND-gate 24. Since the other input of AND-gate 24 is in receipt of a "1" signal, its output signal becomes a "0". Thus, upon completion of the exposure of a single frame, both inputs of OR-gate 7 are in receipt of "0" signals. Accordingly the output signal or OR-gate 7 is a "0". The complete operating cycle is finished.

For the release switch 8, use could also be made of a switch to whose output is connected a differentiator; this would afford the advantage that the duration of the pulse from the release switch would be completely independent of the time interval during which the release switch is actually held closed. However, this is not necessary if use is being made of dynamically triggered logic-circuit components.

Program 2 (title) consists, as indicated in line 2 of FIG. 3, of a 300-millisecond pause followed by a scene duration of 40 milliseconds, this being repeated eight times.

When release switch 8 is closed, pause counter 6 is started, and after counting three 100-millisecond pulses is stopped and reset. Next, scene counter 11 starts to count and electromagnet 16 is energized. After counting the first 40-millisecond pulse, scene counter 11 is stopped and reset. Simultaneously, electromagnet 16 becomes deenergized. Simultaneously, repetition counter 19 is started. The output (right terminal) of comparator 20 carries a "0" signal. Accordingly, the output of inverter 23 carries a "1" signal. During the shut-off of scene counter 11, both inputs of AND-gate 24 are in receipt of "1" signals; accordingly, a "1" signal is transmitted to the input of OR-gate 7. As a result, a "1" signal appears at the output of OR-gate 7 and restarts pause counter 6. This occurs, all in all, eight times. At the end of the seventh repetition, a "1" signal appears at the output of comparator 20, resulting in the application of a "0" signal to the start input of pause counter 6. Accordingly, there is not another restarting of pause counter 6.

If program 3 is selected, a scene of 5.08 seconds duration is immediately filmed without a preceding pause or time delay, and without repetition. When release switch 8 is closed, pause counter 6 is started and simultaneously therewith stopped, since the signals on lines L1 to L6, at the moment pause counter 6 is started, are already in correspondence with the signals (all "0") on the outputs Q1 to Q6 of ROM 10. Immediately after the closing of release switch 8, scene counter 11 is started, electromagnet 16 becomes energized, and motor 18 switched on. After scene counter 11 has counted 127 40-millisecond pulses, the lines L7 to L13 all carry "1" signals. Since this corresponds to the signals on outputs Q7 to Q13 of ROM 10, scene counter 11 is stopped and reset. Simultaneously, a "1" signal is applied to the start input of repetition counter 19, whose comparator 20 immediately responds by applying a "1" signal to inverter 23. As with Program 1, the start input of pause counter 6 then receives a "0" signal, and the exposure operation has now been completed.

With Program 4 (automatic signal-frame), output Q18 of ROM 10 carries a "1" signal, whereas outputs Q14 to Q17 all carry "0" signals. Consequently, during Program 4, repetition counter 19 does not count. As with Program 1, after a pause duration of 100 milliseconds, relay 16 and electric motor 18 are switched on for a time interval of 40 milliseconds. At this moment, a "1" signal appears at the input of AND-gate 25. Since the other input of AND-gate 25 is connected to output Q18 of ROM 10 and is in constant receipt of a "1" signal therefrom during Program 4, after each single-frame cycle a "1" signal is applied via the OR-gate 7 to the start input of pause counter 6. Accordingly, the single-frame cycle is continually (i.e., indefinitely) repeated.

Programs 5 to 8 differ from Program 4, just described, only with respect to the duration of the pause intermediate successive single-frame exposures.

The utility of the illustrated control circuit in photographic apparatuses is very wide-ranging, and is discussed as follows:

In Program 1, when release switch 8 is closed, there ensues a 100-millisecond preliminary pause, followed by the performance of a single exposure. If the photographic apparatus is a motion-picture or still-picture camera, the 100-millisecond pause will, for example, allow the automatic diaphragm control system, if activated concurrently with switch 8, to properly adjust the diaphragm before the exposure is performed. If the preliminary pause is selected of longer duration, this will allow the photographer time enough to step from behind a tripod-mounted camera to a position in front of the camera, for self-portraiting. If the photographic apparatus is a slide projector, then closing release switch 8 will cause the next slide to be projected, in which case the scene duration (projection duration for one slide) established for scene counter 11 should be of an appropriately long value. This likewise applies to a motion-picture projector, when the latter is being used for single-frame projection, i.e., for editing, analysis, or the like.

In Program 2, when release switch 8 is closed, there ensues a 300-millisecond pause followed by the performance of a single-frame exposure requiring 40 milliseconds, this 340-millisecond operation being performed a total of eight times, for the exposure of eight frames. This sequence has utility in motion-picture cameras, for example for filming titles, or in general limited-duration scenes. For limited-duration scenes, the preselected number of repetitions might appropriately be greater, so that each time release switch 8 is closed, a scene of for example 10-seconds duration is filmed. In a motion-picture projector, closing of release switch 8 would cause eight frames to be projected in succession, e.g., for editing or analysis purposes. If the eight successive motion-picture frames are to be viewed at other than normal projection speed, e.g., for analysis purposes, the pause-duration between the projection of successive frames can be preselected appropriately longer. In a still camera, closing of switch 8 would result in the performance of eight successive exposures, at 300-millisecond intervals. This is useful, for example, in fashion, news and advertising photography. In a slide projector, closing of switch 8 would result in the projection of eight successive slides, at 300-millisecond intervals. This mode of operation has utility, for example, in criminal identification; the projection of eight slides in quick succession makes for quick viewing, whereas the stopping of the projector after each eight slides gives the viewer the opportunity to momentarily relax and develop a reaction to what has been viewed.

In Program 3, when release switch 8 is closed there ensues, without a preceding pause being introduced by counter 6, the exposure of 127 successive frames, followed by automatic shut-off. In motion-picture cameras and projectors this again has utility for the filming and projection of limited-duration scenes at normal speed, e.g., for editing in the latter case and for self-portraiting in the former case. The utility of this operating mode for still cameras and slide projectors is substantially the same as for Program 2, except of course that ordinarily fewer than 127 frames would be exposed or projected in a single run.

In Program 4, when release switch 8 is closed, there ensues a 100-millisecond pause followed by a single-frame exposure requiring 40 milliseconds, this 140-millisecond operation being repeated indefinitely, i.e., until a manual shut-off switch or the like is activated. In a motion-picture camera, the introduction of the 100-millisecond pause intermediate successive 40-millisecond exposures can be used for speeding-up action, e.g., for special-effects purposes when filing a slowly occurring event. Alternatively, the motion-picture camera may be driven in an intermittent manner, with the intermittent pauses introduced by pause counter 6 being relied upon even for normal-speed filming. In that event, by reducing the duration of the intermediate pause established by pause counter 6, slow-motion effects can be produced. The foregoing applies also to a motion-picture projector. Program 4 would be applicable to still cameras, in the same sense as Program 3 discussed above, e.g., for quick-succession shooting in fashion photography and the like; however, whereas in Program 3 eight frames are exposed in quick succession when switch 8 is closed, in Program 4 the quick succession of frame exposures is of unlimited duration, i.e., proceeds until positively stopped by the photographer. Program 4 is also of utility in slide projectors, in which case it establishes the frequency with which slides are changed. For slide projection, the 40-millisecond exposure interval established by scene counter 11 could be replaced by a 0-millisecond time interval, if the electromagnet 16 is merely tripping a slide-changing device, i.e., not separately determining the duration for which the slide is being projected. If scene counter 11 is separately determining the projection duration (in contrast to the slide-change frequency determined by pause counter 6), then the 40-millisecond time interval would be replaced by an appropriately longer time interval.

Programs 5 to 8 differ from Program 4, just discussed, only with respect to the duration of the pause established by pause counter 6. The utility of these programs is otherwise the same as for Program 4.

In the appended claims the expression scene production is used in the sense of (re)production, inasmuch as the inventive concepts are applicable to both camera and reproducing apparatuses, as explained above.

It will be understood that each of the elements described above, or two or more together, may also find a useful application in other types of circuits differing from the types described above.

While the invention has been illustrated and described as embodied in a motion-picture camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a photographic apparatus, a circuit operative for controlling the number of times, the durations, and the sequences in which scene-pause operations, scene-production operations, scene-pause-and-production repetition operations, and the like, are performed, the circuit comprising, in combination,
   pulse-generating means operative for generating pulse trains;
   frequency-dividing means for receiving the pulse trains and producing frequency-divided pulse trains whose pulse-repetition frequency and period determine the minimum duration for each of the different operations;
   a series of digital counters, one for each of the different operations,
   each counter having a counting input connected to receive one of the frequency-divided pulse trains,
   each counter having a start input and a stop-and-reset input,
   each counter having a plurality of outputs on which to furnish digital count signals;
   an addressable read-only memory having a plurality of addressing-signal inputs and plural sets of desired-value-signal outputs;
   program-selecting means operative for causing different desired-value signals to appear on the desired-value-signal outputs of the memory by applying to the addressing-signal inputs thereof different addressing signals;
   a series of digital comparators, one for each counter,
   each comparator having a plurality of actual-value-signal inputs connected to the outputs of the associated counter,
   each comparator having a plurality of desired-value-signal inputs connected to a respective one of the sets of desired-value-signal outputs of the memory,
   each comparator having an output connected to the stop-and-reset input of the associated counter,
   each comparator except for the last in the series having its comparator output also connected to the start input of the next counter in the series,
   whereby when the desired-value and actual-value signals of any one of the comparators coincide the resultant comparator output signal stops and resets the respective counter for terminating the operation associated with that counter,
   and whereby the comparator output signal of any comparator except the last comparator in the series additionally causes the next counter in the series to start counting for initiating the operation associated with such counter;
   electromechanical activating means controllable for effecting the performance of the different operations; and
   a logic circuit connecting the output of the last comparator to the start input of the first counter and operative for applying signals to the start input of the first counter in dependence upon at least the signals at the output of the last comparator, and also connecting the output of at least one of the comparators to the electromechanical activating means for controlling the latter in dependence upon the signals at the former.

2. In a photographic apparatus as defined in claim 1,
   the first counter in the series of counters being a scene-pause counter for determining the duration of scene-pause operations,
   the second counter in the series of counters being a scene-production counter for determining the duration of scene-production operations, the last counter in the series of counters being a repetition counter for determining the number of times the operations controlled by the first and second counters are to be repeated.

3. In a photographic apparatus as defined in claim 2, the photographic apparatus being a motion-picture camera, the electromechanical activating means being a shutter-drive motor, the logic circuit connecting the output of the comparator associated with the second counter to the shutter-drive motor for controlling the latter in dependence upon the state of that comparator.

4. In a photographic apparatus as defined in claim 3, the frequency-dividing means comprising first frequency-dividing means operative for applying to the counting input of the second counter a frequency-divided pulse train whose pulse-repetition period corresponds to the duration of a single-frame exposure, and second frequency-dividing means operative for applying to the counting input of the first counter a frequency-divided pulse train whose pulse-repetition period establishes the minimum duration of the scene-pause operation.

5. In a photographic apparatus as defined in claim 2, the logic circuit comprising an OR-gate and an AND-gate, the output of the OR-gate being connected to the start input of the scene-pause counter, one input of the OR-gate being connected to the output of the AND-gate, the OR-gate having a further input, additionally including a release switch connected to the further input of the OR-gate, one input of the AND-gate being connected to the output of the comparator associated with the scene-production counter, the AND-gate having a further input, additionally including an inverter having an output connected to the further input of the AND-gate, the input of the inverter being connected to the output of the comparator associated with the repetition counter.

6. In a photographic apparatus as defined in claim 1, the counters, comparators and the logic circuit each comprising JK flip-flops clocked by the pulse-generating means.

7. In a photographic apparatus as defined in claim 1, the first counter in the series of counters being a scene-pause counter for determining the duration of scene-pause operations, the second counter in the series of counters being a scene-production counter for determining the duration of scene-production operations, the read-only memory having in addition to the desired-value-signal outputs an unlimited-repetition-signal output for furnishing unlimited-repetition signals in dependence upon the addressing signals, the logic circuit connecting the unlimited-repetition-signal output and also the output of the comparator associated with the scene-production counter to the start input of the scene-pause counter for automatically and repeatedly starting the scene-pause counter in dependence upon the signals at both the unlimited-repetition-signal output and at the output of the comparator associated with the scene-production counter.

8. In a photographic apparatus as defined in claim 1, the first counter in the series of counters being a scene-pause counter for determining the duration of scene-pause operations, the second counter in the series of counters being a scene-production counter for determing the duration of scene-production operations, the last counter in the series of counters being a repetition counter for determing the number of times the operations controlled by the first and second counters are to be repeated, the read-only memory having in addition to the desired-value-signal outputs an unlimited-repetition-signal output for furnishing unlimited-repetition signals in dependence upon the addressing signals, further including a release switch, the logic circuit including an OR-gate, an inverter, a first AND-gate and a second AND-gate, the output of the comparator associated with the repetition counter being connected to the input of the inverter, the first AND-gate having one input connected to the output of the inverter and a second input connected to one input of the second AND-gate and also connected to the output of the comparator associated with the scene-production counter, the outputs of both the first and second AND-gate being connected to one input of the OR-gate, the other input of the OR-gate being connected to the release switch, the output of the OR-gate being connected to the start input of the scene-pause counter.

* * * * *